United States Patent

Wakabayashi

[11] Patent Number: 5,698,243
[45] Date of Patent: Dec. 16, 1997

[54] MOLD APPARATUS FOR SIMULTANEOUSLY MOLDING TWO CROSS-LINKED ANNULAR PARTS

[75] Inventor: Masao Wakabayashi, Toyama-ken, Japan

[73] Assignee: YKK Corporation, Tokyo, Japan

[21] Appl. No.: 633,015

[22] Filed: Apr. 16, 1996

[30] Foreign Application Priority Data

Apr. 17, 1995 [JP] Japan ................ 7-090461

[51] Int. Cl.⁶ ............... B29C 45/33; B29C 45/44
[52] U.S. Cl. ............ 425/545; 29/409; 164/342; 425/814
[58] Field of Search ............ 425/545, DIG. 34, 425/577, 814, DIG. 58; 29/409; 164/340, 342

[56] References Cited

U.S. PATENT DOCUMENTS

| | | | |
|---|---|---|---|
| 2,736,062 | 2/1956 | Scheuermann et al. | 425/DIG. 58 |
| 3,328,848 | 7/1967 | Heichel et al. | 425/DIG. 34 |
| 3,490,100 | 1/1970 | Funke | 425/DIG. 34 |
| 4,210,196 | 7/1980 | Weiner | 164/342 |
| 4,790,973 | 12/1988 | Minami et al. | 425/DIG. 34 |
| 5,073,103 | 12/1991 | Liao | 425/545 |

FOREIGN PATENT DOCUMENTS

| | | | |
|---|---|---|---|
| 0 604 695 A1 | 7/1994 | European Pat. Off. | 425/545 |
| 618029 | 2/1961 | Italy | 164/342 |
| 53-46222 | 12/1978 | Japan | 425/DIG. 34 |

*Primary Examiner*—Robert Davis
*Attorney, Agent, or Firm*—Hill, Steadman & Simpson

[57] ABSTRACT

In a mold apparatus for simultaneously molding two cross-linked annular parts, having first through fourth split cores arranged in a cross pattern, firstly the adjacent first and second split cores are moved by first split core moving means as guided on fixed dies along a first sliding passageway perpendicularly in the mold opening and closing direction, and then the adjacent third and fourth split cores are moved toward and away from part of movable dies simultaneously when the part of the movable dies is moved toward and away in the mold opening and closing direction by guide means. At the same time, the third and fourth split cores are moved away from the molded product along a second sliding passageway by a link mechanism composed of arms.

5 Claims, 9 Drawing Sheets

MOLD APPARATUS FOR SIMULTANEOUSLY MOLDING TWO CROSS-LINKED ANNULAR PARTS

BACKGROUND OF THE INVENTION

1. Field of the Invention

This invention relates to a mold apparatus for molding various kinds of products, e.g., two cross-linked annular parts, and more particularly to a mold apparatus, for injection molding or die casting, with which two cross-linked ring-shape parts of synthetic resin or metal can be simultaneously manufactured.

2. Description of the Related Art

A molding technology is currently known for simultaneously molding a chain, or a slide fastener pull tab and a slider body, using four split dies. This conventional art is exemplified by Japanese Patent Publications Nos. Sho 43-3025 and 53-46222, according to which a mold apparatus for manufacturing a chain comprises four split dies obtained by dividing a mold into four pieces each having a predetermined length. The four split dies have in their respective parting faces quarter-ring-shape cavities formed longitudinally at predetermined distances and each communicating with a companion die, one of the split dies having a runner communicating with the individual cavity via a gate. For manufacturing the chain, with the parting faces of the four split dies in contact with one another, molten material is introduced into the individual ring-shape cavities via the runner, and after cooling, the individual split dies are opened so that a molded product is removed from the split dies. At that time, the individual rings are simultaneously molded as linked with one to the next so as to be in a chain.

A molding technology for continuously molding a slide fastener pull tab and a slider body is disclosed in, for example, U.S. Pat. No. 2,736,062 and European Patent No. 0604695. For attaching the pull tab to the slider body of the slider, a ring-shape connecting portion of the pull tab is threaded through a ring-shape connecting lug of the slider body. According to the molding technology disclosed in each of the above-mentioned prior art publications, at least the ring-shape connecting portion of the pull tab and the ring-shape connecting lug of the slider body are simultaneously molded using four split cores. Its molding principle is identical with that of the chain molding technology.

In the chain molding technology, since many annular parts are respectively each in the shape of a simple ring, they can be molded in succession using the four split cores without any other one. In molding the slide fastener pull tab and the slider body, unlike the chain molding, partly since the pull tab is in the form of a substantially rectangular plate having in one end the ring-shape connection portion, and partly since the slider has, in addition to the ring-shape connecting lug, a central guide post connecting upper and lower wings which jointly define a substantially Y-shape guide channel for guiding a pair of fastener element rows of the slide fastener, it requires, in addition to four split cores, independent dies for molding the slider body including part of the ring-shape connecting lug and the rectangular plate of the pull tab.

In this case, the four split cores are positioned between one of the added dies for the rectangular plate of the pull tab and the other die for the slider body including part of the ring-shape connecting lug. For example, in the slider molding apparatus disclosed in U.S. Pat. No. 2,736,062, each of the fixed and movable dies have cavities for molding the slider body and the pull tab and sliding grooves for guiding the four split cores. When all of the cores are closed, molten material is introduced into the cavities via the runner so that a pull tab and a slider body are simultaneously molded in an interlinked form as a complete slider. While the dies are opened, two of the four split cores are firstly retracted along the sliding grooves in the fixed die, then the movable die is moved together with the other two split cores inserted into the sliding grooves of the movable die, then the latter two split cores are retracted into the movable die, and finally an ejector is actuated to remove the molded product out of the movable die. Thus according to the above-mentioned U.S. Patent, since many components of the mold apparatus are moved successively with time differences when the mold is opened, it takes long time for a single molding cycle, causing a large influence on the rate of production.

On the other hand, European Patent Specification No. 0604695 discloses a moving mechanism for the four split cores. According to this European patent, the four split cores are slidable in sliding grooves, respectively, which are formed in a substantially cross posture in the fixed and movable dies, toward and away from the crossing point and are normally urged away from one another by compression springs. Each remote end surface of the individual split core is in contact with a wedge member slidably inserted into the fixed and movable dies; if the wedge member is slid when opening the mold, each split core is moved away from the crossing point under the resiliency of the compression spring, whereupon the ejector operates to remove the molded slider, with the pull tab connected to the slider body, out of the mold.

The above-mentioned European Publication merely discloses the cooperation of the fixed and movable dies and are totally silent about what timing these dies are opened and how they are positioned when moving. Partly since the movement of the split cores is uncertain due to the compression springs and partly since there is no holder for holding a molded product when finally opening the mold before removing the product, there is a danger that the position of holding the product would not be constant, causing a possibility of fault in removing the product.

SUMMARY OF THE INVENTION

It is therefore an object of this invention to provide a mold apparatus, for simultaneously molding two cross-linked ring-shape parts, in which apparatus four split cores are moved with high precision, and a molded product can be removed reliably.

In order to accomplish the above object, according to this invention, there is provided a mold apparatus for simultaneously molding two mutually movably cross-linked annular parts, comprising: first, second, third and fourth split cores arranged in a cross pattern for forming connecting portions of the two annular parts; a number of fixed dies having a first sliding passageway for slidingly guiding the first and second split cores, which are adjacent to each other, in a mold opening and closing direction in a cross pattern at a predetermined angle; a number of movable dies having a second sliding passageway for slidingly guiding the third and fourth split dies, which are adjacent to each other, in mold opening and closing direction in a cross pattern at a predetermined angle; first split core moving means operable in synchronism with the opening and closing movements of the movable dies for sliding the first and second split cores along the first sliding passageway; second split core moving means operable in response to the opening and closing movements of the movable dies for sliding the third and fourth split cores along the second sliding passageway; and the second split die moving means being a link mechanism composed of two arms by which part of the movable dies are connected to the third and fourth split cores, respectively.

Preferably, the part of the movable dies is separated from the other part of the movable dies defining the second sliding passageway, and has guide means movable in response to the mold opening and closing movements of the other part of the movable dies for guiding the part of the movable dies toward and away from the part of the movable dies. The guide means includes a pair of guide-pin holes formed in the other part of the movable dies, and a pair of guide pins to be inserted into the guide-pin holes. The split core moving means includes an actuating member and a cylinder for moving the actuating member vertically, the actuating member having an end portion bent in the mold opening and closing direction, a distal end of the bent end portion being slidably inserted into the first and second split cores.

Preferably, each of the adjacent first and second split cores cross each of the adjacent third and fourth split cores, respectively, at a predetermined angle of 60° through 120°.

In operation, with the mold closed, a predetermined amount of molten molding material is introduced into the individual cavities via a runner. Thereafter, while the mold is clamped, the molten material becomes solid. Upon completion of this solidification, firstly the first split core moving means becomes operative to retract the first and second split cores along the first sliding passageway away from a molded product in the cavities. Subsequently, when the mold is opened, the central part of the movable dies having the second sliding passageway, is moved in the mold opening direction, and at the same time, the side parts of the movable dies, which are separated by the central part, are moved in the mold opening direction and away from each other as guided by the respective guide pins.

As the side parts of the movable dies are moved away from the central part, the third and fourth cores are slid in the mold opening direction along the second passageway via the arms, which link with the side parts of the movable dies, with the molded product left in part of the cavities of the movable dies. Then the ejector is operated to remove the molded product out of the mold, at which time the movement of the third and fourth split cores is restricted by stops projecting from the side parts of the movable dies. The stops serves to normally push the third and fourth split cores at their respective rear ends during opening and closing of the mold, bringing the third and fourth split cores reliably in contact with the first and second split cores during molding.

Then, the individual component parts of the mold move reversely to close the mold again for subsequent molding. Each of the arms connecting the third and fourth split cores with the side parts of the split cores has in one end a pin hole in the form of a slot through which a connecting pin is inserted to connect each arm with the corresponding side part of the movable dies, the individual arm is free to make a slight movement, so the third and fourth split cores can be smoothly moved in the second passageway.

DETAILED DESCRIPTION OF THE PREFERRED EMBODIMENTS

Typical embodiments of this invention will now be described in detail with reference to the accompanying drawings.

Figure 1:
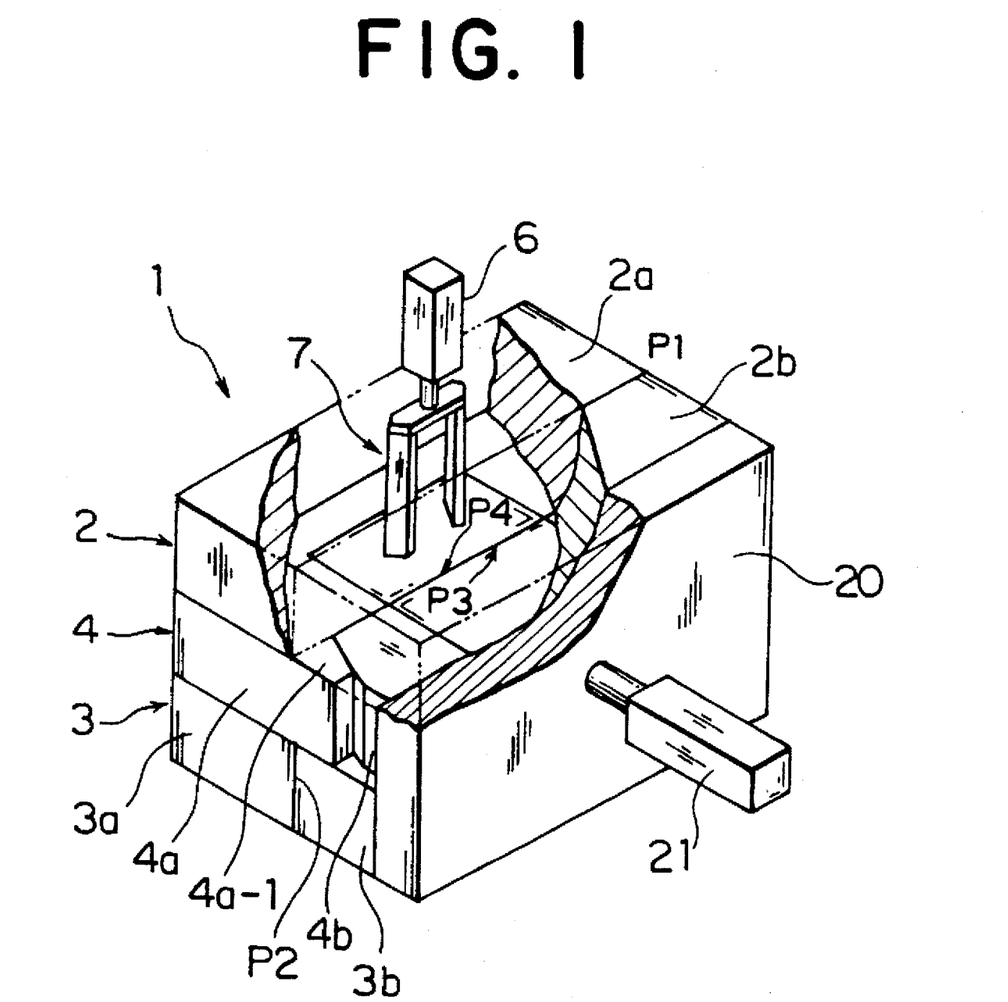
FIG. 1 is a perspective view, with parts broken away, of an mold apparatus, for simultaneously molding two crosslinked ring-shape parts, according to a typical embodiment of this invention.

FIG. 1 is a perspective view, with parts broken away, of a mold apparatus, for molding a slide fastener slider, according to a first embodiment of this invention. As shown in FIG. 1, the mold apparatus 1 comprises upper dies 2 for molding a pull tab, lower dies 3 for molding a slider body, and intermediate dies 4 for simultaneously molding a ring-shape connecting portion, which is to be integrally formed with the pull tab, and a ring-shape connecting lug which is to be integrally formed on the upper surface of the slider body, in a cross-linked form. The upper, lower and intermediate dies 2, 3, 4 are divided respectively into halves in the mold opening and closing direction to form fixed dies 2a, 3a, 4a and movable dies 2b, 3b, 4b.

Figure 2:
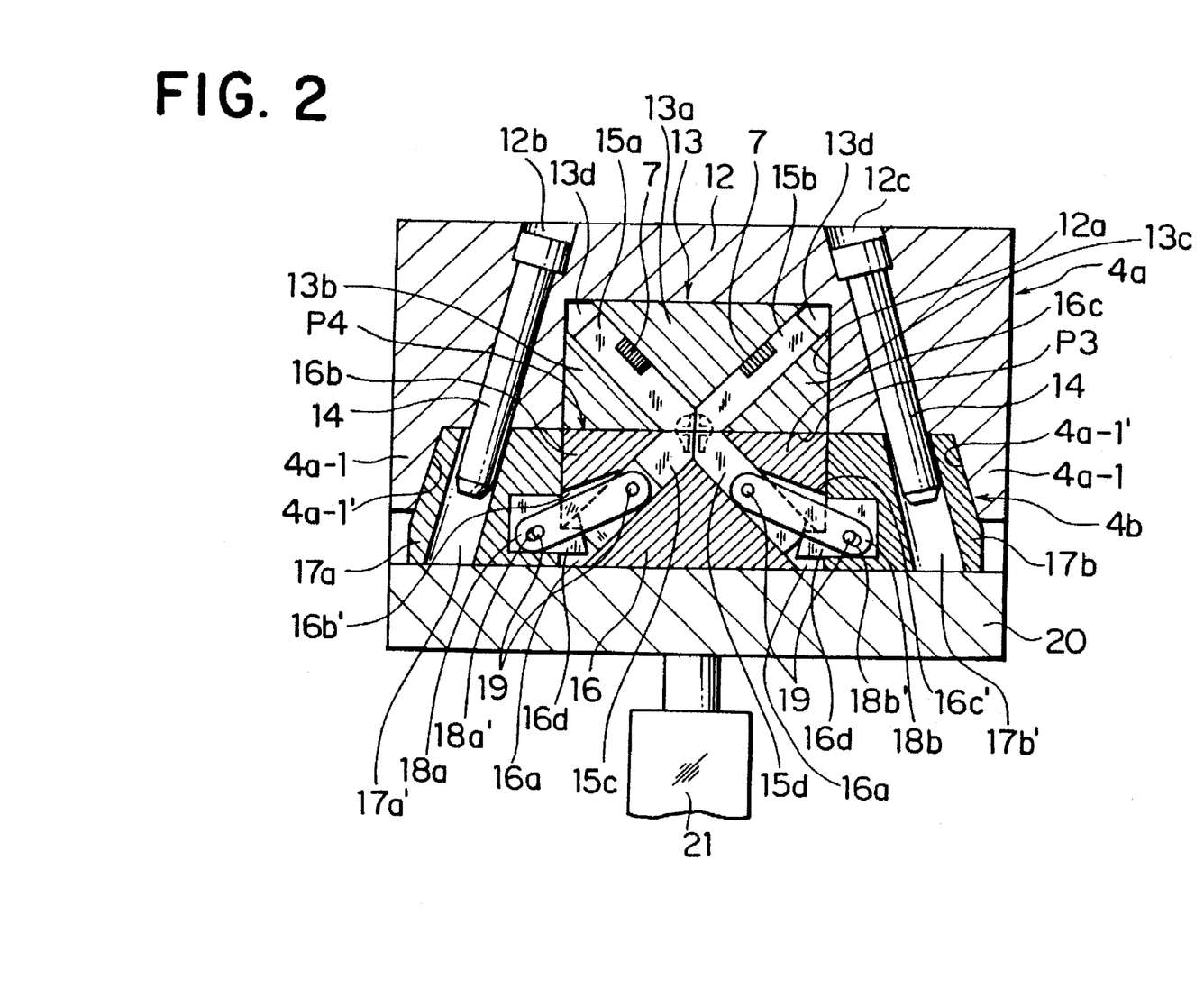
FIG. 2 is a horizontal cross-sectional view of the intermediate dies while being closed, which constitute the feature of the invention.
Figure 3:
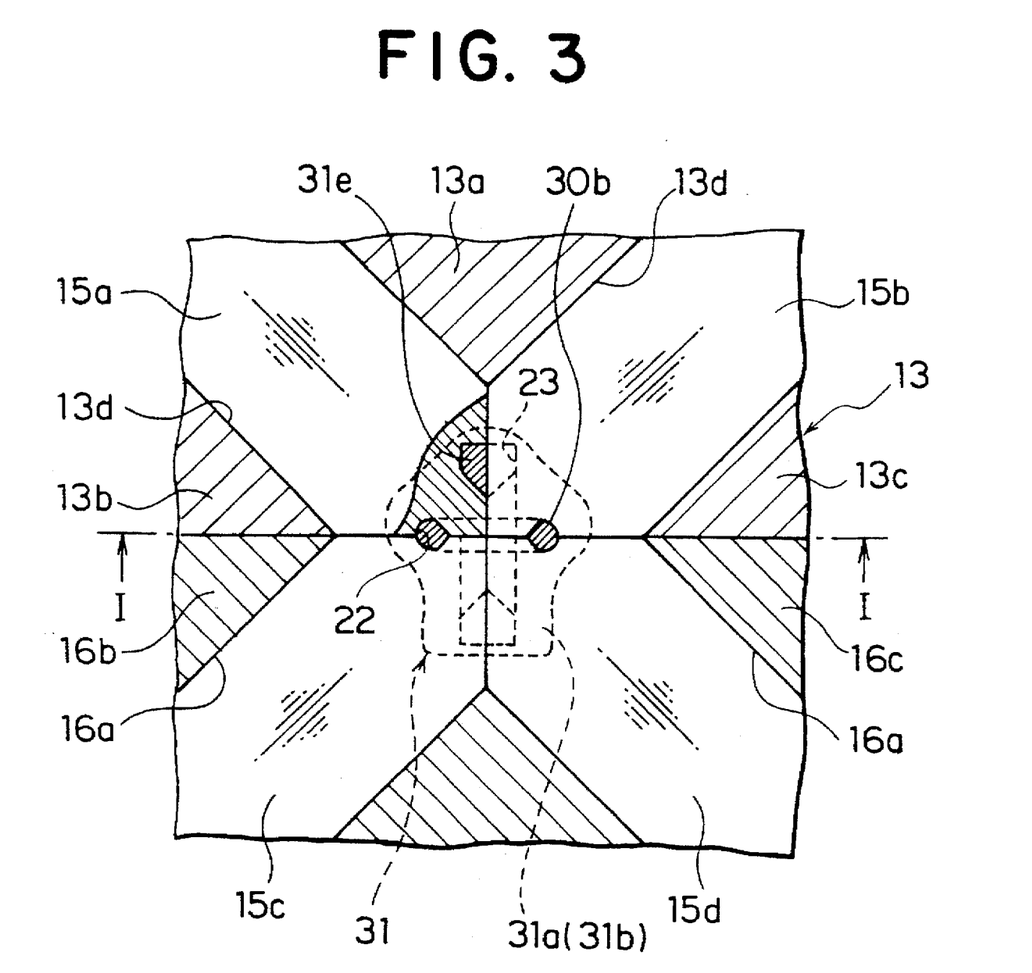
FIG. 3 is an enlarged horizontal cross-sectional view of the mold apparatus, showing the manner in which the joint of a slider body and a pull tab is molded by four split cores in the intermediate dies.
Figure 4:
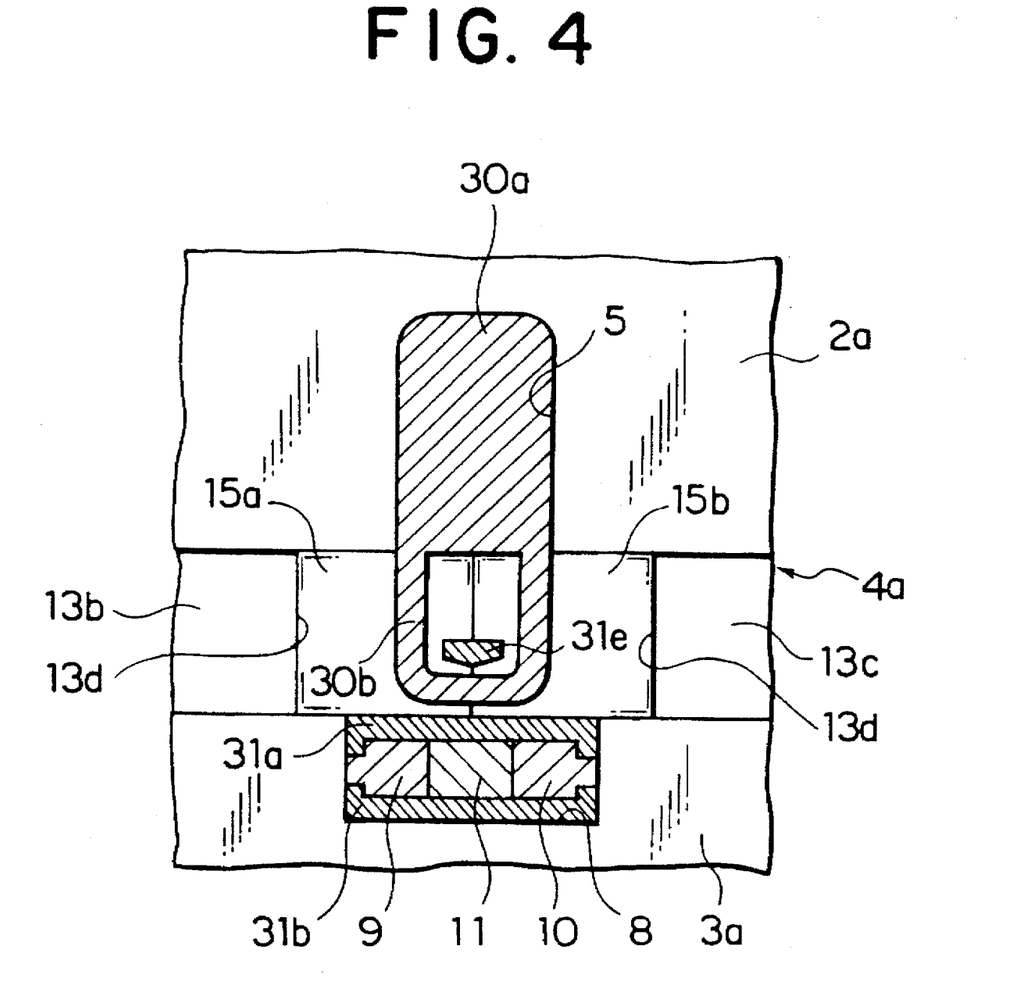
FIG. 4 is a cross-sectional view taken along line I—I of FIG. 3.

FIGS. 2, 3 and 4 show the mold structure, which constitutes a particularly important part of this embodiment, for molding the joint of a pull tab and a slider body. Each of the fixed upper die 2a and the movable upper die 2b is in the form of a rectangular-solid block as shown in FIG. 1 and has in its parting face P1 a cavity 5 for molding a body 30a of a pull tab 30 as shown in FIG. 4. The fixed upper die 2a has a non-illustrated through-hole through which an actuating member 7 of a second cylinder 6 described below is to be inserted.

Figure 7:
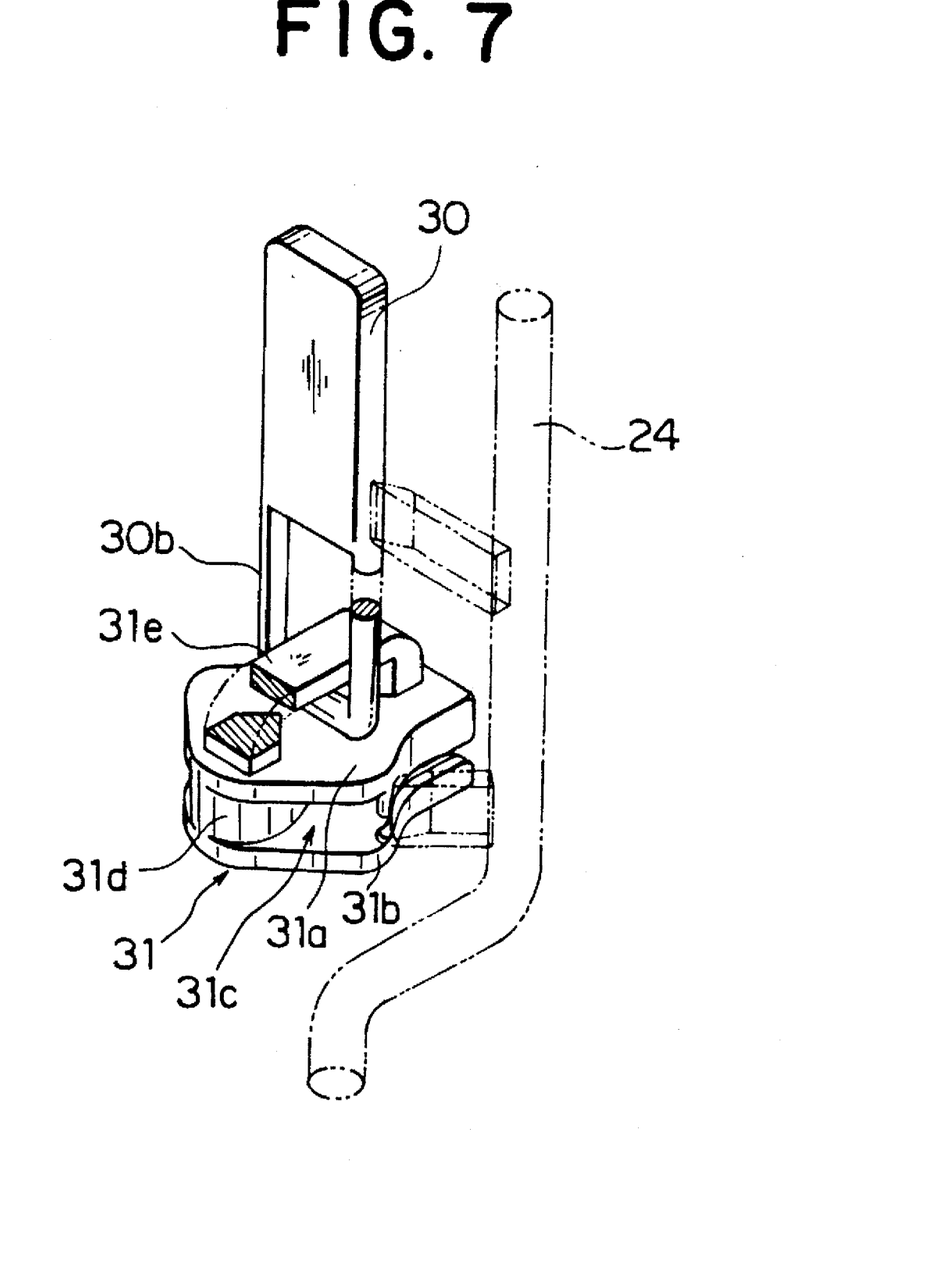
FIG. 7 is a perspective view of a slide fastener slider to be molded on the mold apparatus.

In the lower dies 3, like the upper dies 2, each of the fixed lower die 3a and the movable lower die 3b is in the form of a rectangular-solid block as shown in FIG. 1 and has in its parting face P2 a cavity 8 for molding a slider body 31 as shown in FIG. 4. The slider body 31 is composed of an upper wing 31a, a lower wing 31b, and a central guide post 31d for joining and supporting the upper and lower wings 31a, 31b with a predetermined distance between them and for defining a substantially Y-shape element guide channel 31c for passage of a pair of fastener element rows of a non-illustrated slide fastener, as shown in FIG. 7. In this structure, some of the cavities 8 forming on the parting face P2 cannot have a complete shape for molding the exact structure of the slider body 31, merely profiling the contour of the slider body 31. Consequently, as shown in FIG. 4, in the cavities 8, a pair of opposite fixed side cores 9, 10 for forming the element guide channel 31c, and a movable central core 11 inserted between the two fixed side cores 9, 10 and having such a shape as to form part of the element guide channel 31c and to leave a molding hollow for the central guide post 31d.

Regarding the intermediate dies 4, which is the most important part of the mold apparatus of this invention, the fixed intermediate die 4a is composed of a block 12 having toward a parting face P3 a rectangular cutout 12a, and a fitting member 13 to be fixedly received in the cutout 12a of the block 12, giving a generally C-shape profile as a whole. Opposite end projections 4a-1 of the C-shape fixed intermediate die 4a have outwardly diverging inside wall surfaces as taper surfaces 4a-1'. The block 12 has a pair of diverging guide pin holes 12b, 12c extending through the block 12 in parallel to the respective taper surfaces 4a'-1 at opposite sides of the fitting member 13. In each of the guide pin holes 12b, 12c, a guide pin 14 is inserted so as to project over the parting surface P3.

The fitting member 13 is composed of a first guide member 13a in the shape of a right-angled equilateral triangle whose one side subtending the right angle is fixed to a central wall surface of the cutout 12a with a predetermined space left at each end, and second and third guide members 13b, 13c each in the shape of a right-angled equilateral triangle, half in size of the first guide member 13a, whose one side subtending the right angle is fixed to the corresponding side wall surface of the cutout 12a with a predetermined space left at each end. As a result, a right-angled V-shape sliding passageway 13d is defined between the first, second and third guide members 13a, 13b, 13c, first and second split cores 15a, 15b of four split cores are slidably inserted in the V-shape sliding passageway 13d.

The movable intermediate die 4b, as described in detail in FIG. 2, is composed of a rectangular first block 16 having a parting face P4 confronting the parting face P3 of the rectangular fitting member 13, and second and third blocks 17a, 17b situated one on each side of the first block 16 and slidable along the corresponding taper surfaces 4a-1' of the fixed intermediate die 4a. The first block 16 has a sliding passageway 16a having a shape in mirror-image symmetry with respect to the V-shape sliding passageway 13d of the fitting member 13. Accordingly the two V-shape sliding passageways 13d, 16a assume a cross posture inclined by 45° when the parting faces P3, P4 are in contact with each other. A pair of opposite side right-angled equilateral triangular portions 16b, 16c defining the sliding passageway 16a have each a triangular cutout 16b', 16c' having a predetermined depth. The second and third blocks 17a, 17b are symmetrical with respect to the vertical axis and have each a trapezoidal contour. Each of the second and third blocks 17a, 17b has guide pin holes 17a', 17b' extending through the blocks as an extension of and having the same diameter of the corresponding guide pin holes 12b, 12c of the fixed intermediate 4a. Further, each of the second and third blocks 17a, 17b has a stop 16d projecting into the corresponding end of the V-shape sliding passageway 16a of the first block 16 from the side. Given that the two V-shape sliding passageways 13d, 16a assume a cross posture inclined by 45° as they are brought into contact with each other, since the C-shape connecting lug 31e of the slider body 31 extends in the mold opening direction, all the split dies including the split cores 15c, 15d, which will be described below, do not interfere with part of the connecting lug 31e during opening of the mold.

In the V-shape sliding passageway 16a, the third and fourth split cores 15c, 15d are slidably inserted in confronting relationship with the first and second split cores 15a, 15b received in the V-shape sliding passageway 13d of the fixed intermediate die 4a. The third and fourth split cores 15c, 15d are linked with the second and third blocks 17a, 17b, respectively, by four connecting pins 19 via arms 18a, 18b.

A pin hole 18a', 18b' of each arm 18a, 18b, through which the connecting pin 19 of each of the second and third blocks 17a, 17b is to be inserted is a slot so that the arm 18a, 18b is allowed to make a slight movement in the longitudinal direction.

The fixed upper die 2a, the fixed intermediate die 4a and the fixed lower die 3a are brought in contact with one another in this order and are fixed to a non-illustrated frame, while the corresponding movable upper die 2b, the first block 16 situated centrally of the movable intermediate die 4b, and the movable lower die 3b are fixed at their end surfaces to a base plate 20 in a superposed form, as shown in FIG. 1. At that time, the second and third blocks 17a, 17b situated one at each side of the movable intermediate die 4b are not fixed to the base plate 20, receiving, in their respective guide pin holes 17a', 17b', the end portions of the corresponding guide pins 14 projecting from the fixed intermediate die 4a. Attached to the base plate 20 is a first cylinder 21 operable to move the upper, intermediate and lower movable dies 2b, 4b, 3b as a unit toward and away from the respective fixed dies 2a, 4a, 3a.

FIGS. 2 through 5 show the moving mechanism of the intermediate dies 4 when opening and closing, which is a feature of the invention, and the cavity structure of the first through fourth split cores 15a–15d. Each split core 15a–15d has on its end a pair of surfaces crossing at a right angle; all the split cores 15a–15d assume a cross posture as their end surfaces are in contact with one another when the split core 15a–15d are slid in the corresponding V-shape sliding passageways 13d, 16a toward one another. Each split core 15a–15d has in its end surface a cavity 22 or 23 for simultaneously molding a generally U-shape connecting portion 30b of the pull tab 30 and a generally C-shape ringed connecting lug 31e of the slider body 31 in a cross-linked form.

Figure 6:
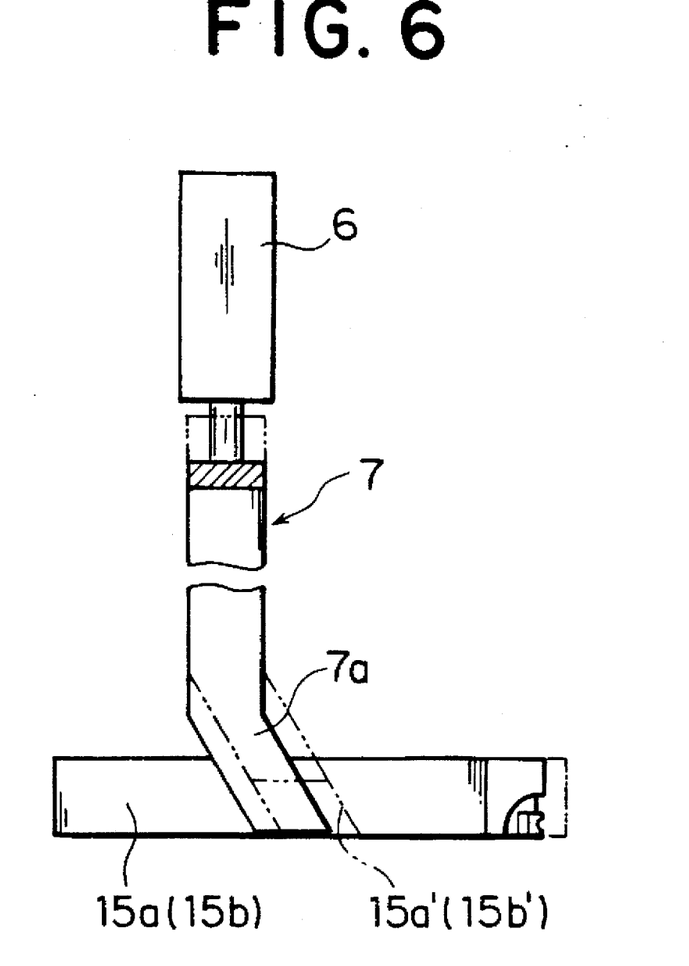
FIG. 6 is a fragmentary side view of a split core moving mechanism for sliding the split cores in sliding passageways of an intermediate fixed die.

In this embodiment, as shown in FIG. 1, a second cylinder 6 is mounted on the top of the fixed upper die 2a and has a rod end to which a bifurcated actuating member 7 is attached in suspension. The bifurcated actuating member 7 is inserted through the through-hole of the fixed upper die 2a to project into the V-shape sliding passageway 13d of the fixed intermediate 4a. FIG. 6 shows the manner in which the bifurcated end of the actuating member 7 is received in receiving holes 15a', 15b' formed in the first and second split cores 15a, 15b, which are slidable in the V-shape sliding passageway 13d. The end portion 7a of the actuating member 7 bent as shown in FIG. 6. As the second cylinder 6 is operated, the actuating member 7 is moved upwardly and downwardly between a solid-line position and a phantom-line position in FIG. 6, and at the same time, the end portion 7a of the actuating member 7 is moved forward and backwardly (horizontally in FIG. 6) between a solid-line position and a phantom-line position, thereby moving the first and second split cores 15a, 15b forwardly and backwardly by a predetermined distance.

According to the mold apparatus 1 of this embodiment, when the upper, intermediate and lower movable dies 2b, 4b, 3b are brought into contact with the fixed dies 2a, 4a, 3a, as shown in FIGS. 1 and 2, as the first cylinder 21 is operated to expand, a predetermined amount of molten material, such as aluminum alloy, is introduced into the individual cavities via a runner 24 (indicated by phantom lines in FIG. 7) as shown in FIGS. 3 and 4. At that time, the second cylinder 6 assumes a contracting position so that the actuating member 7 is located in the phantom-line position in FIG. 6.

Then the molten material becomes solid during clamping of the mold. Upon completion of this solidification, the second cylinder 6 is operated in the expanding direction to retract the first and second split cores 15a, 15b away from a molded product in the cavities to the solid-line position in FIG. 6. Subsequently, the upper, intermediate and lower movable dies 2b, 4b, 3b are moved together away from the fixed dies 2a, 4a, 3a as the first cylinder 21 is operated to contract. Then, the first block 16 situated centrally of the intermediate movable die 4b is moved in the mold opening direction, while the second and third blocks 17a, 17b situated one at each side of the first block 16 are moved in the mold opening direction away from the first block 16 along the corresponding taper surfaces 4a-1', 4a-1' formed on the opposite projections 4a-1 of the intermediate fixed die 4a as they are guided by the respective guide pins 14, 14.

Figure 5:
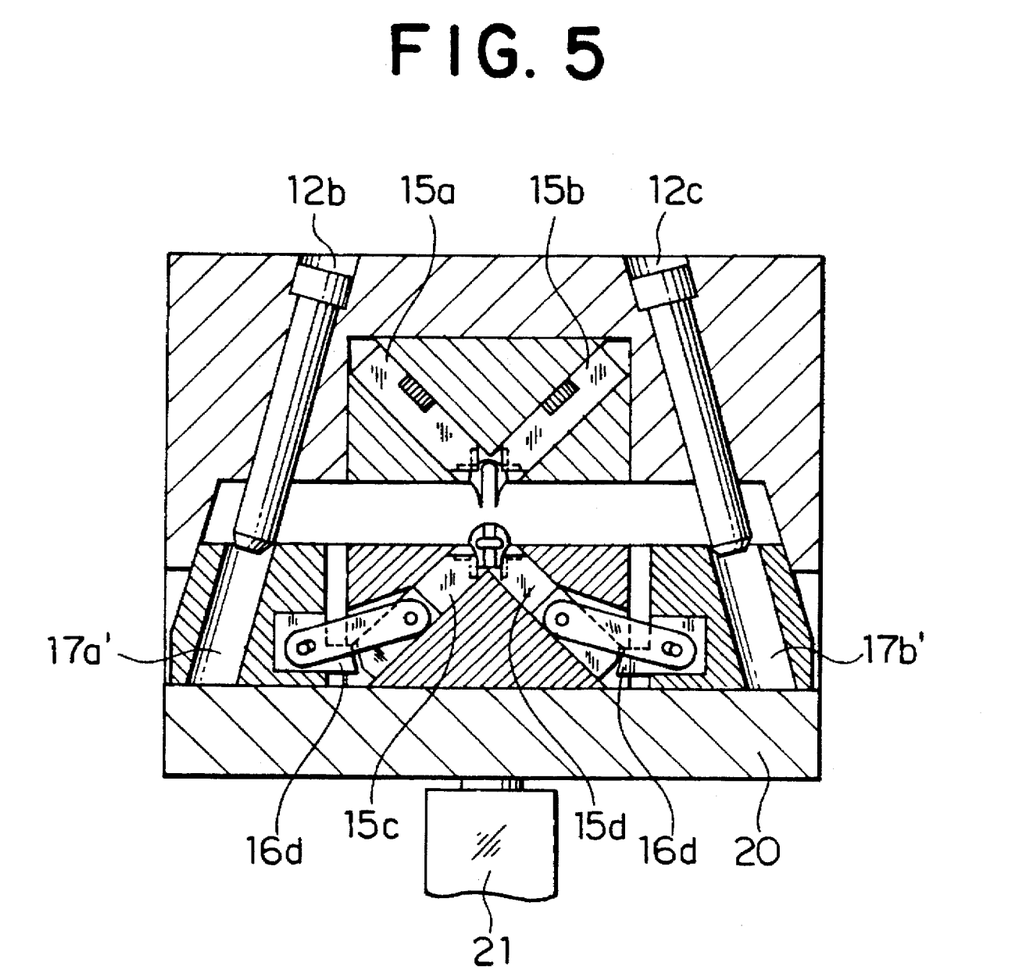
FIG. 5 is a horizontal cross-sectional view of the mold apparatus, showing the manner in which the intermediate dies are opened.

As the second and third blocks 17a, 17b are moved away from the first block 16 progressively remotely, the third and fourth split cores 15c, 15d are slid in the mold opening direction along the sliding passageway 16a of the first block 16 via the arms 18a, 18b, which connect the third and fourth split cores 15c, 15d with the second and third blocks 17a, 17b respectively, with a molded product left in the cavities of the upper and lower movable dies 2b, 3b, assuming the position of FIG. 5. Now the non-illustrated ejector is operated to remove the molded product, in which the pull tab 30 and the slider body 31 are linked as shown in FIG. 7, out of the mold. At that time, the movement of the third and fourth split cores 15c, 15d are limited by the stops 16d, 16d. The stops 16d, 16d serve to normally push the third and fourth split cores 15c, 15d at their respective rear ends during opening and closing of the mold, bringing the third and fourth split cores 15c, 15d reliably in contact with the first and second split cores 15a, 15b during molding.

Then, the individual component parts of the mold move reversely to close the mold again for subsequent molding. Assuming that each of the arms 18a, 18b connecting the third and fourth split cores 15c, 15d with the second and third blocks 17a, 17b has in one end a pin hole 18a' or 18b' in the form of a slot through which a connecting pins 19, 19 is inserted to connect each arm 18a, 18b with the second and third blocks 17a, 17b respectively, the individual arm 18a, 18b is free to make a slight movement so that the third and fourth split cores 15c, 15d can be smoothly moved in the sliding passageway 16a.

Figure 8:
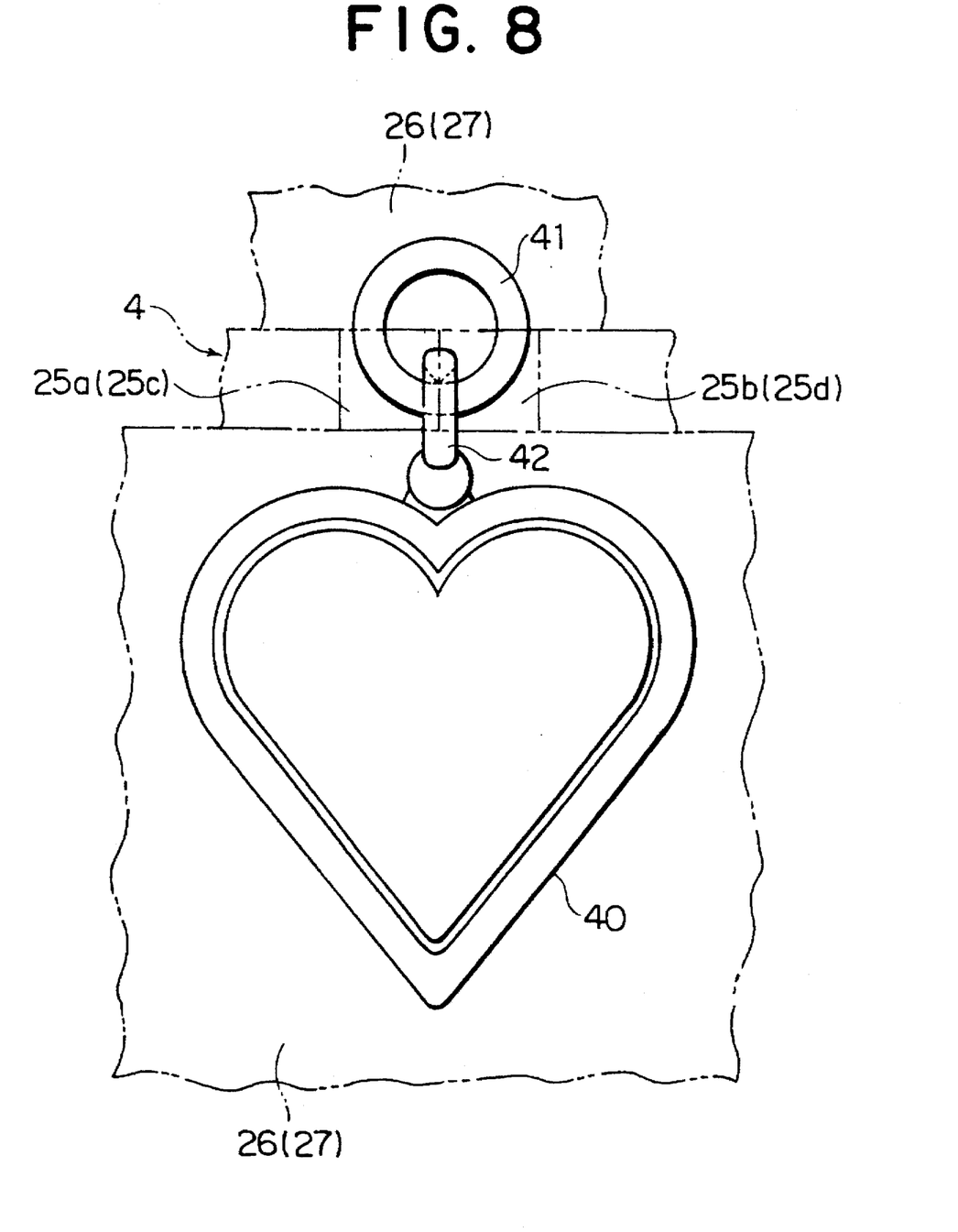
FIG. 8 is a front view of a chain pull tab, with a swivel joint, to be molded on a mold apparatus according to another embodiment of this invention.
Figure 9:
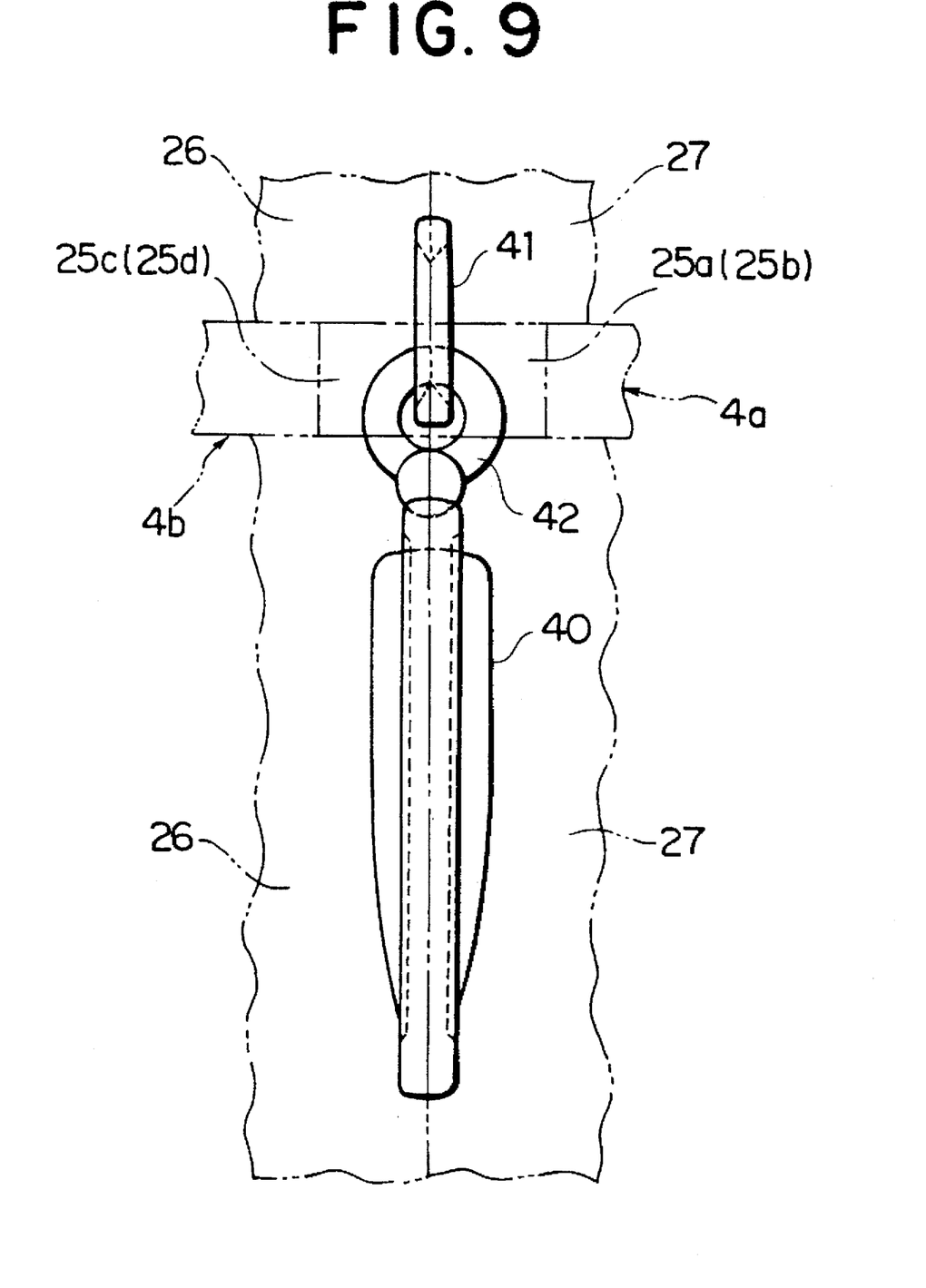
FIG. 9 is a side view of FIG. 8.

FIGS. 8 and 9 show a chain pull tab, with a swivel joint, which is molded on a mold apparatus according to a second embodiment of this invention. The chain pull tab is composed of a heart-shape pull tab body 40 and a pair of interlinked rings 41, 42 connected to the pull tab body 40, which are simultaneously molded in a linked form. Also in this embodiment, four split cores 25a-25d identical in structure with the four split cores 15a-15d of the first embodiment are used in molding the cross-linked part of the first and second rings 41, 42, while the remaining part of the first and second rings 41, 42 and the heart-shape pull tab body 40 are molded by the two split cores 26, 27 as shown in phantom lines in FIGS. 8 and 9. Of course, the shapes of the cavities formed in the four split cores 25a-25d and the two split cores 26, 27 in this embodiment are different from those in the first embodiment. The mold apparatus of this invention should by no means be limited in use for the illustrated products and may be applied for many other products as long as such product includes two ring-shape parts to be freely movably cross-linked.

As is apparent from the foregoing description, according to the mold apparatus 1 of this invention, partly since two split cores 15c, 15d are slidably received in the sliding passageway 16a of the intermediate movable die 4b, and partly since the individual split cores 15a-15d are linked with the intermediate movable die 4b relatively and rotatably by the respective arms 18a, 18b, it is possible to open and close the individual split cores 15a-15d reliably at good proper timing in a mechanical action in response to the opening and closing of the mold. Further, since a molded product in the cavities can be left exactly in a predetermined position within the movable dies 2b, 4b, 3b during opening of the mold, it is possible to ensure the removing of the molded product by the ejector.

In the arrangement in which the actuating means for the fixed split cores 15a, 15b is composed of an actuating member 7 to be moved upwardly and downwardly by a cylinder 6 and having an end portion bent in the mold opening and closing direction and slidably inserted into the two split cores 15a, 15b in the fixed intermediate die 4a, since a through-hole of each split core 15a or 15b for insertion of the end portion of the actuating member 7 can be set in very small size, it is possible to widen the area of the rear surface of the cavity on which the clamping force is exerted. Also since it is possible to reduce the thickness of the fixed dies 4a and hence to make a sprue shorter, improving the yield.

What is claimed is:

1. A mold apparatus for simultaneously molding two mutually movably cross-linked annular parts, comprising:

(a) first, second, third and fourth split cores arranged in a cross pattern for forming connecting portions of the two annular parts;

(b) a number of fixed dies having a first sliding passageway for slidingly guiding said first and second split cores, which are adjacent to each other, in a mold opening and closing direction in a cross pattern at a predetermined angle;

(c) a number of movable dies having a second sliding passageway for slidingly guiding said third and fourth split cores, which are adjacent to each other, in mold opening and closing direction in a cross pattern at a predetermined angle;

(d) first split core moving means operable in synchronism with the opening and closing movements of said movable dies for sliding said first and second split cores along said first sliding passageway;

(e) second split core moving means operable in response to the opening and closing movements of said movable dies for sliding said third and fourth split cores along said second sliding passageway; and (f) said second split core moving means being a link mechanism composed of two arms by which part of said movable dies are connected to said third and fourth split cores, respectively.

2. A mold apparatus according to claim 1, wherein said part of said movable dies is separated from other part of said movable dies defining said second sliding passageway, and has guide means movable in response to the mold opening and closing movements of said other part of said movable dies for guiding said other part of said movable dies toward and away from said other part of said movable dies.

3. A mold apparatus according to claim 2, wherein said guide means includes a pair of guide-pin holes formed in said part of said movable dies, and a pair of guide pins to be inserted into said guide-pin holes.

4. A mold apparatus according to claim 1, wherein said first split core moving means include an actuating member and a cylinder for moving said actuating member vertically, said actuating member having an end portion bent in the mold opening and closing direction, a distal end of the bent end portion being slidably inserted into said first and second split cores.

5. A mold apparatus according to claim 1, wherein each of said adjacent first and second split cores cross each of said adjacent third and fourth split cores, respectively, at a predetermined angle of 60° through 120°.

* * * * *